(12) United States Patent
Wick

(10) Patent No.: US 10,865,522 B2
(45) Date of Patent: Dec. 15, 2020

(54) CONTROL SYSTEM FOR A FUNCTIONAL SECTION OF A PAPER PROCESSING DEVICE

(71) Applicant: BOBST GRENCHEN AG, Grenchen (CH)

(72) Inventor: Stefan Wick, Oberbuchsiten (CH)

(73) Assignee: Bobst Grenchen AG, Grenchen (CH)

( * ) Notice: Subject to any disclaimer, the term of this patent is extended or adjusted under 35 U.S.C. 154(b) by 91 days.

(21) Appl. No.: 16/301,771

(22) PCT Filed: May 9, 2017

(86) PCT No.: PCT/EP2017/025113
§ 371 (c)(1),
(2) Date: Nov. 15, 2018

(87) PCT Pub. No.: WO2017/198342
PCT Pub. Date: Nov. 23, 2017

(65) Prior Publication Data
US 2019/0211505 A1 Jul. 11, 2019

(30) Foreign Application Priority Data

May 18, 2016 (DE) .......................... 10 2016 109 128

(51) Int. Cl.
*G05B 9/02* (2006.01)
*D21G 5/00* (2006.01)
(Continued)

(52) U.S. Cl.
CPC ................ *D21G 5/00* (2013.01); *F16P 3/142* (2013.01); *G05B 9/02* (2013.01); *G05B 19/042* (2013.01);
(Continued)

(58) Field of Classification Search
None
See application file for complete search history.

(56) References Cited

U.S. PATENT DOCUMENTS

2002/0139271 A1* 10/2002 Fischer ............... B41F 33/0018
101/483
2006/0114323 A1* 6/2006 Grimm ............... B41F 33/0018
348/143

FOREIGN PATENT DOCUMENTS

DE 695 17 707 T2 2/2001
DE 102 07 871 A1 10/2002
(Continued)

OTHER PUBLICATIONS

International Search Report dated Aug. 16, 2017 in corresponding PCT International Application No. PCT/EP2017/025113.
(Continued)

*Primary Examiner* — Ryan A Jarrett
(74) *Attorney, Agent, or Firm* — Bookoff McAndrews, PLLC

(57) ABSTRACT

A control system (100) for a functional section (I, II, III) of a paper processing device (140). The control system (100) has at least one safety-monitoring camera (110, 120, 130) which is arranged in the functional section (I, II, III) such that a functional region of the functional section (I, II, III) can be captured by the safety-monitoring camera (110, 120, 130). An operating unit (101) of the system (100) is designed to operate the functional section (I, II, III), and image data of the at least one safety-monitoring camera (110, 120, 130) can be selected by the operating unit (101). A display unit (103) is configured to display the selected image data such that a user allows or blocks the operation of the functional section (I, II, III) based on the displayed image data. A safety device (102) is coupled to the safety-monitoring camera (110, 120, 130) and the operating unit (101), and the safety
(Continued)

device (102) receives image data of the safety-monitoring camera (110, 120, 130). The safety device (102) is configured such that the safety device (102) allows or blocks the operation of the functional section (I, II, III) by means of the operating unit (101) on the basis of the received image data of the safety-monitoring camera (110, 120, 130).

11 Claims, 2 Drawing Sheets

(51) Int. Cl.
*F16P 3/14* (2006.01)
*G05B 19/042* (2006.01)
(52) U.S. Cl.
CPC ................ *G05B 2219/2651* (2013.01); *G05B 2219/50198* (2013.01)

(56) References Cited

FOREIGN PATENT DOCUMENTS

| | | |
|---|---|---|
| DE | 103 38 973 A1 | 4/2004 |
| DE | 600 10 945 T2 | 5/2005 |
| DE | 10 2009 001 026 A1 | 8/2010 |
| EP | 0 837 323 A2 | 4/1998 |
| EP | 1 662 349 A1 | 5/2006 |

OTHER PUBLICATIONS

Written Opinion dated Aug. 16, 2017 in corresponding PCT International Application No. PCT/EP2017/025113.

\* cited by examiner

CONTROL SYSTEM FOR A FUNCTIONAL SECTION OF A PAPER PROCESSING DEVICE

CROSS-REFERENCE TO RELATED APPLICATIONS

The present application is a 35 U.S.C. §§ 371 national phase conversion of PCT/EP2017/025113, filed May 9, 2017, which claims priority of German Patent Application No. 10 2016 109 128.6, filed May 18, 2016, the contents of which are incorporated by reference herein. The PCT International Application was published in the German language.

TECHNICAL FIELD

The invention relates to a control system for a functional section of a paper processing device.

BACKGROUND OF THE INVENTION

Modern production processes in the paper-processing industry, more particularly on multi-stage production lines in the paper-processing industry, are frequently monitored remotely and controlled from distant places. In this connection it is necessary to agree to the maintenance phases precisely with e.g. the maintenance staff, in order to prevent e.g. the production line from being started up, although maintenance staff are still in safety-related areas. More especially in cases where sequences are highly complex and where multiple maintenance teams are at work, agreements that are made may frequently be poor, so the production line is stopped without reason or is brought into operation, although operation has not yet been cleared for safety reasons.

DE 695 17 707 T2 discloses a system for monitoring a continuous manufacturing process, more particularly by a paper processing device. The device has five sections, in each of which a respective camera is disposed. A control system makes the captured data available to display means. In operation, the display means monitor certain characteristics of a product being produced by means of the device. If a deviation of the certain characteristic is detected by means of a detector, the device can be stopped.

DE 600 10 945 T2 discloses a device for the monitoring web breaks in a paper machine. The device has a plurality of cameras for monitoring a paper web. Moreover the device has digital image processing equipment for storing the image data. Selection means are provided, which choose a focused picture region from the image data. An alarm device is configured to generate a break alarm of the web on the basis of the image data.

DE 10 2009 001 026 A1 discloses a method and a measuring device for optical recording and evaluation of a paper web. An image camera determines disturbances in a paper web. A sensor analyzes a structure of the paper web. Moreover an evaluation unit can be provided, which controls a processing system based on the obtained image data of the paper web.

EP 0 837 323 A2 discloses a video surveillance system for fast-moving tapes on a paper machine. Video cameras are arranged above and below a paper machine at certain places along the paper web. Capturing devices capture image data from the cameras. A control unit monitors the video surveillance system. The image data can be displayed on various monitors. In this connection a certain image region that is to be considered can be determined by means of switches. Moreover an alarm signal can be generated, if a tear in the paper web is detected.

PRESENTATION OF THE INVENTION

It is an object of the present invention, to improve the occupational safety of a paper processing device.

This object is achieved with a control system for a functional section of a paper processing device according to the disclosure herein.

According to a first aspect of the present invention a control system for a functional section of a paper processing device is described. The control system has at least one safety-monitoring camera, which is arranged in the functional section, such that a functional region of the functional section can be captured by the safety-monitoring camera. The system moreover has an operating unit, which is designed to operate the functional section. The system also has a display unit. The image data of the at least one safety-monitoring camera can be selected with the operating unit. The display unit is configured to display the selected image data, such that a user allows or blocks the operation of the functional section based on the displayed image data. The control system has a safety device, which is coupled to the safety-monitoring camera and the operating unit. The safety device receives image data of the safety-monitoring camera, wherein the safety device is configured to allow the operation of the functional section by means of the operating unit or blocks the operation of the functional section by means of the operating unit on the basis of the received image data of the safety-monitoring camera.

The paper processing device is configured more particularly to process paper, more particularly cardboard layers and cardboard packaging. Along the processing process of the paper processing device, for example, cardboard packaging can be produced in multiple layers, cut to size and/or printed. The paper processing device has, more particularly, multiple functional sections, wherein each functional section defines one processing step in each case. A functional section comprises for example a stacking device (for stacking flat cardboard packaging elements or for taking individual cardboard packaging elements from a stack), a laminating device (for bonding multiple layers of paper or cardboard layers), a paper feed device and/or a drying device.

The operating device is configured to run and operate the functional section and accordingly the paper processing device. In this connection the operating device can be installed at a distance spatially from the functional section and, for example, the paper processing device. The operating device can for example transfer control data by wire or wirelessly to the paper processing device, in order to transmit control commands or to receive status data or control data from the paper processing device. The operating unit is, for example, a computer, which processes the corresponding data by means of a microprocessor. Moreover the operating unit has an input element, for example a keyboard.

The safety-monitoring camera or multiple safety-monitoring cameras of a group are assigned to a functional section. The safety-monitoring camera captures particular safety-related regions in the functional section. For example, the safety-related regions may represent maintenance regions, maintenance installations or other movable machine elements in the functional section, which must be handled or maintained by an operator during maintenance or repair. The safety-monitoring cameras monitor the safety-related regions of the functional section and capture image data (single images, film sequences or live streams) and transmit the image data to the operating unit and/or the display unit.

Using the system according to the invention, it is decided on the basis of captured image data of safety-monitoring cameras (by the user himself or by a safety device described below), whether operation, more particularly remote operation, of a functional section with an operating unit is or is not acceptable for reasons of safety. Thus, safety for users and also for the processing process is increased.

The safety device analyses and appraises the captured image data. On the basis of the captured image data the safety device blocks the operating unit or gives it clearance. Based on the image data, if the safety device for example identifies a person in the functional section, the safety device blocks the operating unit. This means that, for example, any activation of the processing process in the functional section by the operating unit is impossible. If the operating unit is located at a distance from the functional section, any remote control of the functional section is thereby prevented. Alternatively, on the basis of the image data, the safety device can identify whether the safety-monitoring cameras are working correctly. If the safety device detects that the safety-monitoring cameras are not working correctly, the safety device blocks the operating unit likewise, in order to prevent overhasty and unnecessary termination of the process in the functional section.

According to a further exemplary embodiment, the safety device is configured to compare the captured image data with target image data. The safety device allows the operation of the functional section by means of the operating unit or blocks the operation of the functional section on the basis of the agreement of the image data with the target image data.

According to a further exemplary embodiment the control system has at least one process camera, which is arranged in the functional section, such that a work process can be captured in the functional section by means of the process camera. The process camera is coupled to the operating unit or the safety device in such a way that this can be terminated by means of the operating unit (by the user) or by the safety device on the basis of the captured work process. The process camera captures more particularly process-related images of the work process. For example, the position of a paper web or the unrolling behavior of the paper web from the roll can be captured with the process camera. Based on the captured image data of the work process, if the safety device detects that, for example, the path of a paper web is not running correctly, the safety device can terminate the work process by itself.

While the process camera captures images of a work process, in comparison with this, the safety-monitoring camera captures the working space in the functional region, which can be accessed by a person. In this connection, it is entirely possible that a process camera functions as safety-monitoring camera, and vice versa.

According to a further exemplary embodiment, the control system has a display unit. The image data of the at least one safety-monitoring camera can be selected with the operating unit, wherein the display unit is configured to display the selected image data. In this connection the display unit is for example a screen or a multimedia projector.

According to a further exemplary embodiment, the display unit and the operating unit are configured integrally as a touch-screen. For example, the touch-screen is a capacitive display.

According to a further exemplary embodiment, the display unit is configured, such that the functional section of the paper processing device can be displayed, wherein the operating unit is configured so that the displayed functional section can be selected. Based on the selected functional section, the operating unit is configured to display on the display unit the functional region of the functional section captured by means of the safety-monitoring camera. Thus the paper processing device and accordingly its functional sections can be depicted on the display unit (e.g. the touch-screen). By means of finger pressure on the operating unit (e.g. a display region of a corresponding functional section on the touch-screen), a user can select the same. Then the images of the safety-monitoring camera and/or of the process camera on the display unit are depicted on the display unit. Moreover, the operating state of the work process from the functional section can be depicted on the display unit. Furthermore it can be displayed to the user, whether the safety-monitoring camera is supplying image data, which allows operation of the operating unit or not.

According to a further exemplary embodiment, the control system has moreover a first group of safety-monitoring cameras, which are disposed in the functional section, such that the functional region of the functional section can be captured by the safety-monitoring cameras of the first group. Moreover, the control system has a second group of safety-monitoring cameras, which are disposed in a further functional section, such that a further functional region of the further functional section can be captured by the safety-monitoring cameras of the second group.

According to a further exemplary embodiment, the safety device is configured, such that the safety device allows or blocks the operation of the functional section by means of the operating unit based on the displayed first image data of the first group of safety-monitoring cameras and that the safety device allows or blocks the operation of the further functional section by means of the operating unit based on the displayed second image data of the second group of safety-monitoring cameras.

According to a further exemplary embodiment the safety device is configured, so as to compare captured first image data of the first group of safety-monitoring cameras with first target image data and second image data of the second group of safety-monitoring cameras with second target image data, wherein the safety device represents the first image data of the first group of safety-monitoring cameras and/or the second image data of the second group of safety-monitoring cameras on the display unit on the basis of the result of the comparison. In other words the images of the first or second safety-monitoring cameras are displayed, not in response to the explicit selection of a user, but automatically or by the safety device itself. Thus, the user can monitor the state of the plant on the display unit and his attention is drawn automatically to malfunctions through the automatic display of the image data of the critical functional sections on the display unit.

According to a further exemplary embodiment, the operating unit is configured such that the functional section and/or the further functional section can be selected by a user. The operating unit is configured to represent the first group of safety-monitoring cameras or the second group of safety-monitoring cameras on the display unit on the basis of the selection of the functional section or of the further functional section.

According to a further aspect of the present invention, a method for the operation of a control system for a functional section of a paper processing device is described. A functional region of a functional section is captured by a safety-monitoring camera, wherein the control system has the at least one safety-monitoring camera, which is arranged in the functional section. The functional section is operated with an operating unit of the control system. The image data of the at least one safety-monitoring camera can be selected with the operating unit. A display unit is configured to display the selected image data, such that a user allows or blocks the operation of the functional section based on the displayed image data.

According to a further exemplary embodiment a safety device is coupled to the safety-monitoring camera and the operating unit. The safety device receives image data of the safety-monitoring camera. Any operation of the functional section by means of the operating unit is allowed or blocked by the safety device based on the received image data of the safety-monitoring camera.

According to a further embodiment of the method, the functional section of the paper processing device is displayed on the display unit. The displayed functional section is selected with the operating unit. The safety device displays the functional region of the functional section captured by means of the safety-monitoring camera on the display unit on the basis of the selected functional section.

According to a further exemplary embodiment of the method, the functional region of the functional section is displayed by means of safety-monitoring cameras of a first group. A further functional region of a further functional section is displayed by means of safety-monitoring cameras of a second group.

According to a further exemplary embodiment of the method, the safety device allows or blocks the operation of the functional section by means of the operating unit based on the displayed first image data of the first group of safety-monitoring cameras. Moreover, the safety device allows or blocks the operation of the further functional section by means of the operating unit based on the displayed second image data of the second group of safety-monitoring cameras According to a further exemplary embodiment of the method, first image data of the first group of safety-monitoring cameras captured by means of the safety device are compared with first target image data and second image data of the second group of safety-monitoring cameras are compared with second target image data, wherein the safety device represents the first image data of the first group of safety-monitoring cameras and/or the second image data of the second group of safety-monitoring cameras on the display unit on the basis of the result of the comparison. In other words the images of the first or second safety-monitoring cameras are displayed not in response to the explicit selection of a user but automatically or by the safety device itself. Thus, the user can monitor the state of the plant on the display unit and his attention is drawn automatically to malfunctions through the automatic display of the image data of the critical functional sections on the display unit.

Attention is drawn to the fact that the embodiments described here represent only a limited selection of possible embodiment variants of the invention. Thus it is possible to combine the features of individual embodiments with one another in a suitable manner, such that, for the skilled person, a plurality of various embodiments can be viewed as obviously disclosed with the embodiment variants that are explicit here. More particularly, some embodiments of the invention are described with device claims and other embodiments of the invention are described with method claims. Upon the reading of this application it will however become clear immediately to the skilled person, that, unless indicated explicitly otherwise, in addition to a combination of features belonging to a type of subject-matter of the invention any desired combination of features belonging to different types of subject-matter of the invention is possible.

BRIEF DESCRIPTION OF THE DRAWINGS

By way of further explanation and to enable a better understanding of the present invention, exemplary embodiments are explained below in more detail with reference to the appended drawings. The figures show the following.

DETAILED DESCRIPTION OF EXEMPLARY EMBODIMENTS

The same or similar components in different figures are given the same reference signs. The representations in the figures are schematic.

Figure 1:
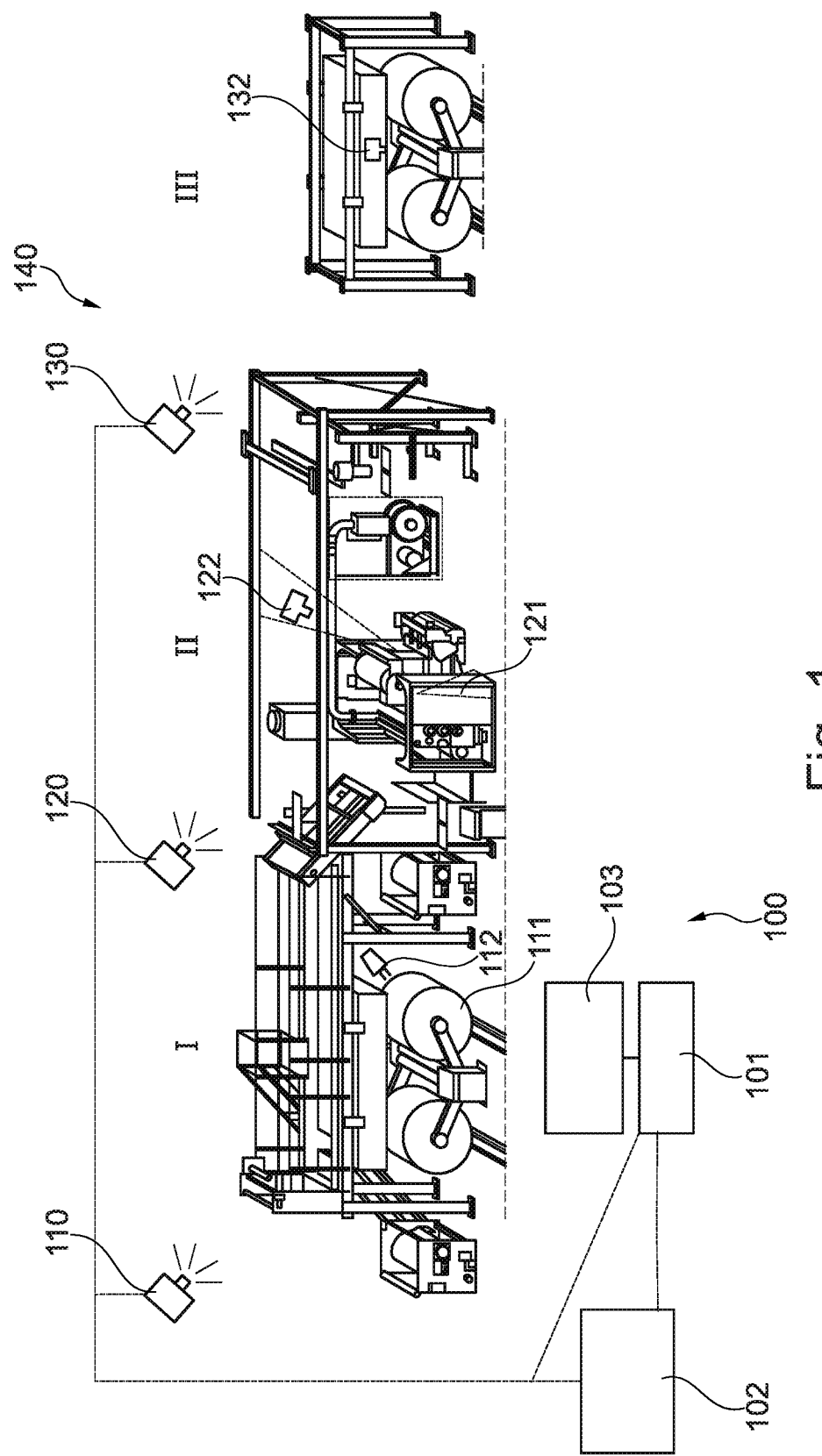
FIG. 1 is a schematic representation of a paper processing device with a control system according to an exemplary embodiment of the present invention.

FIG. 1 shows a control system 100 for a functional section I, II, III of a paper processing device 140. The control system 100 has at least one safety-monitoring camera 110, 120, 130, which is disposed in the functional section I, II, III, such that a functional region of the functional section I, II, III can be captured by means of the safety-monitoring camera 110, 120, 130. An operating unit 101 of the system 100 is designed to operate the functional section I, II, III. The image data of the at least one safety-monitoring camera 110, 120, 130 can be selected with the operating unit 101. A display unit 103 is configured to display the selected image data, such that a user allows or blocks the operation of the functional section I, II, III on the basis of the displayed image data.

Moreover, a safety device 102 can be provided, which is coupled to the safety-monitoring camera 110, 120, 130 and the operating unit 101, wherein the safety device 102 receives image data of the safety-monitoring camera 110, 120, 130. The safety device 102 is configured, such that the safety device 102 allows the operation of the functional section I, II, III by means of the operating unit 101 or blocks the operation of the functional section I, II, III by means of the operating unit 101 on the basis of the received image data of the safety-monitoring camera 110, 120, 130.

The paper processing device 140 is configured to process paper, more particularly cardboard layers and cardboard packaging. Along the processing process of the paper processing device 140, for example, cardboard packaging can be produced in multiple layers, cut to size and/or printed. The paper processing device 140 has more particularly multiple functional sections I, II, III, wherein each functional section I, II, III defines one processing step in a functional region in each case. A functional section I, II, III comprises, for example, a stacking device (for stacking flat cardboard packaging elements or for taking individual cardboard packaging elements from a stack), a laminating device (for bonding multiple layers of paper or cardboard layers), a paper feed device and/or a drying device.

The operating device 101 is configured to run and operate the functional section I, II, III and accordingly the paper processing device 140. In this connection, the operating device 101 is installed at a distance spatially from the functional section I, II, III and for example the paper processing device 140. The operating device 101 can for example transfer control data by wire or wirelessly to the paper processing device 140, in order to transmit control commands or to receive status data or control data from the paper processing device 140. The operating unit 140 has an input element, for example, a keyboard.

The safety-monitoring camera 110, 120, 130 or multiple safety-monitoring cameras 110, 120, 130 of a group are assigned to a functional section I, II, III. The safety-monitoring camera 110, 120, 130 captures particular safety-related regions into the functional section I, II, III. For example, the safety-related regions may represent maintenance regions, maintenance installations or other movable machine elements in the functional section, which must be handled or maintained by an operator during maintenance or repair. The safety-monitoring cameras 110, 120, 130 monitor the safety-related regions of the functional section I, II, III and capture image data (single images or film sequences or live streams) and transmit the image data to the operating unit 101 and/or the safety device 102.

The user analyzes and evaluates the captured image data. Moreover the safety device 102 can analyze and appraise the captured image data. On the basis of the captured image data, the user blocks the operation of the functional sections I, II, III by means of the operating unit 101. Alternatively or additionally, the safety device 102 can block the operating unit 101 or give it clearance.

On the basis of the image data, if the safety device 102 for example identifies a person in the functional section I, II, III, the safety device 102 blocks the operating unit 101. This means that for example any activation of the processing process in the functional section I, II, III by the operating unit 101 is impossible. If the operating unit 101 is located at a distance from the functional section I, II, III, any remote control of the functional section I, II, III is thereby prevented. Alternatively, on the basis of the image data, the safety device 102 can identify, whether the safety-monitoring cameras 110, 120, 130 are working correctly. If the safety device 102 detects that the safety-monitoring cameras 110, 120, 130 are not working correctly, the safety device 102 blocks the operating unit 101 likewise, in order to prevent overhasty and unnecessary termination of the process in the functional section I, II, III.

The control system has at least one process camera 112, 122, 132, which is disposed in the functional section I, II, III, such that a work process 111, 121, 131 in the functional section I, II, III can be captured by means of the process camera 112, 122, 132. The process camera 112, 122, 132 is coupled to the display unit 103 or the operating unit 101, such that, based on the captured work process 111, 121, 131, this can be terminated by the user by means of the operating unit 101. Moreover the process camera 112, 122, 132 can be coupled to the safety device 102, such that, based on the captured work process 111, 121, 131, this can be terminated by means of the safety device 102.

The process camera 112, 122, 132 captures more particularly process-related images of the work process 111, 121, 131. For example the position of a paper web or the unrolling behavior of the paper web from the roll can be captured with the process camera 112, 122, 132. If, on the basis of the captured image data of the work process 111, 121, 131, the safety device 102 detects that, for example, the path of a paper web is not running correctly, the safety device 102 can terminate the work process 111, 121, 131 by itself.

While the process camera 112, 122, 132 captures images of a work process 111, 121, 131, in comparison with this, the safety-monitoring camera 110, 120, 130 captures the working space in the functional region, which can be accessed by a person. In this connection, it is entirely possible that a process camera 112, 122, 132 functions as safety-monitoring camera 110, 120, 130 and vice versa.

The image data of the at least one safety-monitoring camera 110, 120, 130 can be selected with the operating unit 101, wherein a display unit 103 is configured to display the selected image data. The display unit 103 and the operating unit 101 are configured e.g. integrally as touch-screen.

Figure 2:
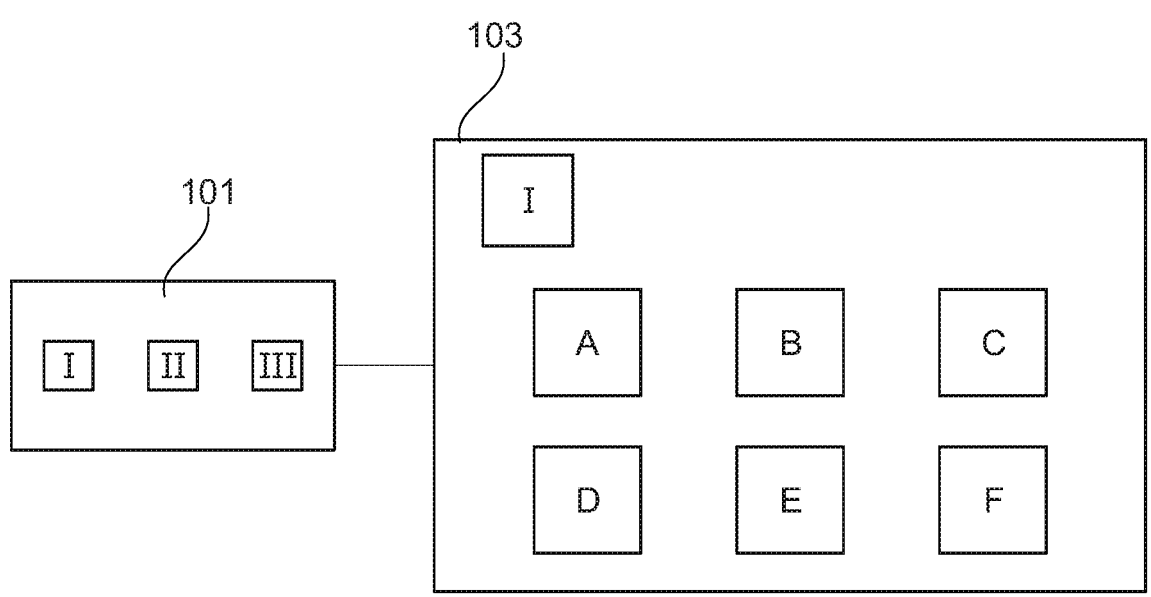
FIG. 2 is a schematic representation of an operating unit and of a display unit according to an exemplary embodiment of the present invention.

FIG. 2 shows an exemplary representation of the operating unit 101 and of the display unit 103. A desired functional section I is selected by means of the operating unit 101. The display unit 103 displays the functional section I of the paper processing device 140. Based on the selected functional section I, the operating unit 101 is configured to display on the display unit 103 the functional region of the functional section I captured by means of the safety-monitoring camera 110 using camera shots A to F of the safety-monitoring cameras 110 from the functional section I. Thus the paper processing device 140 and accordingly its functional sections I, II, III can be depicted on the display unit 103 (e.g. a touch-screen). By means of finger pressure on the operating unit 101 (e.g. a display region of a corresponding functional section on the touch-screen) a user can select the same. Then the images A to F of the safety-monitoring cameras 110 and/or of the process camera 112 on the display unit are depicted on the display unit 103. Moreover the operating state of the work process 111, 121, 131 from the functional section I can be depicted on the display unit 103. Furthermore, it can be displayed to the user, whether the safety-monitoring camera 110 is supplying image data, which allow operation of the operating unit 101 or not.

In addition it should be pointed out that, "comprising" does not exclude any other elements or steps and "one" or "a" does not exclude a plurality. Moreover it should be pointed out that features or steps described with reference to one of the above exemplary embodiments can also be used in combination with other features or steps of other aforedescribed exemplary embodiments. Reference signs in the claims are not to be viewed as a restriction.

REFERENCE SIGNS LIST 100 control system
101 operating unit
102 safety device
103 display unit
110 (first) safety-monitoring camera
111 first work process
112 process camera
120 (second) safety-monitoring camera
121 second work process
122 process camera
130 (third) safety-monitoring camera
131 third work process
132 process camera
140 paper processing device
I first functional section
II second functional section
III third functional section
A-F camera shots

The invention claimed is:
1. A control system for a functional section (I, II, III) of a paper processing device, the control system comprising:

at least one safety-monitoring camera, which is arranged in the functional section (I, II, III), such that image data of a functional region of the functional section (I, II, III) can be captured by the safety-monitoring camera;

an operating unit configured to operate the functional section (I, II, III);

a display unit;

wherein the image data of the at least one safety-monitoring camera can be selected with the operating unit; and wherein the display unit is configured to display the selected image data, such that a user may allow or block the operation of the functional section (I, II, III) based on the displayed image data, and a safety device, which is coupled to the safety-monitoring camera and the operating unit, wherein the safety device receives the image data of the safety-monitoring camera, wherein the safety device is configured such that the safety device allows the operation of the functional section (I, II, III) by means of the operating unit or blocks the operation of the functional section (I, II, III) by means of the operating unit on the basis of the received image data of the safety-monitoring camera.

2. A control system according to claim 1, wherein the functional section (I, II, III) is a stacking device, a laminating device, a paper feed device and/or a drying device.

3. A control system according to claim 1, wherein the safety device is configured to compare the captured image data with target image data; and wherein the safety device allows or blocks the operation of the functional section (I, II, III) by means of the operating unit on the basis of the agreement of the image data with the target image data.

4. A control system according to claim 1, further comprising:

at least one process camera, which is arranged in the functional section (I, II, III), such that a work process in the functional section (I, II, III) can be captured by the process camera; and wherein the process camera is coupled to the operating unit, such that, based on the captured work process, the work process can be terminated by the operating unit.

5. A control system according to claim 4, further comprising:

a first group of safety-monitoring cameras, which are disposed in the functional section (I), such that the functional region of the functional section (I) can be captured by the safety-monitoring cameras of the first group; and a second group of safety-monitoring cameras, which are disposed in a further functional section (II), such that a further functional region of the further functional section (II) can be captured by the safety-monitoring cameras of the second group.

6. A control system according to claim 5, wherein the safety device is configured such that the safety device allows or blocks the operation of the functional section (I) by means of the operating unit on the basis of the received first image data of the first group of safety-monitoring cameras and the safety device allows or blocks the operation of the further functional section (II) by means of the operating unit on the basis of the received second image data of the second group of safety-monitoring cameras.

7. A control system according to claim 6, wherein the safety device is configured so as to compare captured first image data of the first group of safety-monitoring cameras with first target image data and second image data of the second group of safety-monitoring cameras with second target image data; and wherein the safety device represents the first image data of the first group of safety-monitoring cameras and/or the second image data of the second group of safety-monitoring cameras on the display unit on the basis of the result of the comparison.

8. A control system according to claim 5, wherein the operating unit is configured, such that the functional section (I) and/or the further functional section (II) can be selected by a user; and wherein the operating unit is configured to represent the first group of safety-monitoring cameras or the second group of safety-monitoring cameras on the display unit on the basis of the selection of the functional section (I) or of the further functional section (II).

9. A control system according to claim 1, wherein the display unit and the operating unit are configured integrally as touch-screen.

10. A control system according to claim 1, wherein the display unit is configured such that the functional section (I, II, III) of the paper processing device can be displayed;

wherein the operating unit is configured such that the displayed functional section (I, II, III) can be selected; and wherein the operating unit is configured, based on the selected functional section (I, II, III), to display the functional region of the functional section (I, II, III) captured by the safety-monitoring camera on the display unit.

11. A method for controlling a functional section (I, II, III) of a paper processing device, the method comprising:

capturing a functional region of the functional section (I, II, III) by a safety-monitoring camera, which is arranged in the functional section (I, II, III);

operating the functional section (I, II, III) by an operating unit;

selecting image data of the at least one safety-monitoring camera by the operating unit;

wherein the display unit is configured to display the selected image data, such that a user allows or blocks the operation of the functional section (I, II, III) based on the displayed image data;

wherein a safety device, which is coupled to the safety-monitoring camera and the operating unit, receives image data of the safety-monitoring camera; and wherein the safety device is configured such that the safety device allows the operation of the functional section (I, II, III) by means of the operating unit or blocks the operation of the functional section (I, II, III) by means of the operating unit on the basis of the received image data of the safety-monitoring camera.

* * * * *